United States Patent
Bernard et al.

(10) Patent No.: US 8,727,459 B2
(45) Date of Patent: May 20, 2014

(54) MULTIPLE-DOOR SWITCHGEAR CABINET

(75) Inventors: Marco Bernard, Hettstadt (DE); Holger Hartleb, Waldbüttelbrunn (DE); Florian Scherer, Geisslingen (DE)

(73) Assignee: SSI Schäfer Noell GmbH Lager- und Systemtechnik, Giebelstadt (DE)

( * ) Notice: Subject to any disclaimer, the term of this patent is extended or adjusted under 35 U.S.C. 154(b) by 177 days.

(21) Appl. No.: 13/178,637

(22) Filed: Jul. 8, 2011

(65) Prior Publication Data

US 2013/0009524 A1 Jan. 10, 2013

(51) Int. Cl.
*A47B 88/00* (2006.01)
*E05C 9/10* (2006.01)

(52) U.S. Cl.
USPC .......................... 312/324; 312/326; 312/216

(58) Field of Classification Search
USPC ......... 312/216, 324, 109–110, 215, 222, 295, 312/310–311, 139.1; 174/50; 292/DIG. 15, 292/194, 200; 16/82; 49/103–104, 109
See application file for complete search history.

(56) References Cited

U.S. PATENT DOCUMENTS

| | | | | |
|---|---|---|---|---|
| 19,923 A * | 4/1858 | Garlick | | 109/50 |
| 551,490 A * | 12/1895 | Hogaboom | | 292/136 |
| 1,003,873 A * | 9/1911 | Cooper | | 239/73 |
| 1,512,182 A * | 10/1924 | Lundstrom | | 200/50.13 |
| 3,400,353 A * | 9/1968 | Schockelt | | 337/7 |
| 4,073,000 A * | 2/1978 | Krejsa | | 361/616 |
| 4,262,448 A * | 4/1981 | Flider | | 49/367 |
| 5,061,022 A * | 10/1991 | Meriwether | | 312/324 |
| 5,424,500 A * | 6/1995 | Smith | | 200/50.17 |
| 5,582,472 A * | 12/1996 | Lyons et al. | | 312/324 |
| 5,653,057 A * | 8/1997 | Gary | | 49/67 |
| 5,944,399 A * | 8/1999 | Gillispie | | 312/324 |
| 6,250,015 B1 * | 6/2001 | Gillispie | | 49/367 |
| 6,449,904 B1 * | 9/2002 | Paasonen | | 49/103 |
| 6,564,510 B2 * | 5/2003 | Juntunen et al. | | 49/103 |
| 6,921,990 B1 * | 7/2005 | Higgins | | 307/328 |
| 2003/0145522 A1 * | 8/2003 | Karkkainen et al. | | 49/103 |
| 2006/0006773 A1 * | 1/2006 | Guebre-Tsadik et al. | | 312/326 |
| 2006/0016163 A1 * | 1/2006 | O'Connor et al. | | 55/481 |
| 2006/0090482 A1 * | 5/2006 | Dawes | | 62/126 |
| 2008/0106174 A1 * | 5/2008 | Marcus et al. | | 312/215 |
| 2008/0211363 A1 * | 9/2008 | Carter et al. | | 312/216 |
| 2009/0091220 A1 * | 4/2009 | Eyer et al. | | 312/215 |
| 2009/0134756 A1 * | 5/2009 | Kampf et al. | | 312/326 |
| 2010/0139169 A1 * | 6/2010 | Patil et al. | | 49/103 |
| 2010/0201230 A1 * | 8/2010 | Schweitzer et al. | | 312/107 |

* cited by examiner

*Primary Examiner* — Darnell Jayne
*Assistant Examiner* — Ryan A Doyle
(74) *Attorney, Agent, or Firm* — Renner, Otto, Boisselle & Sklar, LLP

(57) ABSTRACT

A multiple-door switchgear cabinet includes a cabinet housing containing electrical equipment and being connectable to a power source. Doors attached to the cabinet housing provide access to the electrical equipment and include a first door and secondary doors. The first door, when closed, provides for electrical continuity through a main electrical power switch, and removes electrical continuity when open. A mechanical interlock controls the order in which the doors are closed. The mechanical interlock is mounted to the cabinet and is in contact with the doors when they are closed, the interlock being biased by a biasing device to bear against the first door when any of the other doors is opened. A locking bar is movably attached to the first door, and releasably attached to the secondary door. wherein attachment to the secondary door prevents both doors from inadvertent opening.

20 Claims, 10 Drawing Sheets

MULTIPLE-DOOR SWITCHGEAR CABINET

FIELD OF THE INVENTION

The present invention relates to a multi-door switchgear cabinet for mounting on a movable carrier of a storage and retrieval device, especially a load handling system.

BACKGROUND OF THE INVENTION

Conventional storage and retrieval devices, also known as stacker cranes, can be used in automated warehouse systems which include a number of racks each having a number of transverse storage positions arranged in a spaced-apart parallel relationship. A transfer device, such as a movable carrier, is provided between or among the racks, with the space between the racks (rack aisle) serving as a travelling path.

The storage and retrieval device may comprise a cart which travels along a rail or track system placed along or adjacent to one or more of the racks. The storage and retrieval device may include a turntable arrangement and a load handling device for picking items from storage locations in the racks.

According to such conventional configurations, a combination of the rails or tracks, the movable carrier, rotation of the turntable and action of the arm/hand, serves to deliver a load between a number of transfer positions, and other identified positions within the warehouse system.

As disclosed in the conventional art, the entire operation of such a storage and retrieval device is powered electrically. Electric power is typically necessary to drive each component within the system.

However, according to the conventional storage and retrieval devices, for safety reasons, it is necessary that electrical power is able to be removed from the system when one or more doors of a switchgear cabinet, such as might be mounted on the movable carrier or cart, are opened. A monitoring device provides this function. However, conventional electrical power monitoring systems for switchgear cabinet doors require electric power. Thus, in order to continuously monitor the opened or closed states of the switchgear cabinet doors, it is necessary to have continuous electrical power to the switchgear cabinet, which, of course, defeats the purpose of the electrical power safety system, and may be contrary to safety regulations in the United States and Canada.

According to the National Fire Protection Association (NFPA79) publication, which is directed to the electrical standards for industrial machinery, an enclosure must be provided for protection in order to prevent direct contact from outside an enclosure, cf. section 6.2.2 of chapter 6. Therein, section 6.2.3 defines the requirements for enclosure interlocking, wherein "each disconnecting means mounted within or adjacent to a control enclosure that contains live parts operating at 50 volts AC (rms value) or 60 volts DC or more shall be mechanically or electrically interlocked, or both, with the control enclosure doors so that none of the doors open unless the power is disconnected. Interlocking shall be reactivated automatically when all the doors are closed." Section 6.2.3.2 further provides that "the interlocking means shall prevent closing of the disconnecting means while the enclosure door is open, unless an interlock is operated by deliberate action."

SUMMARY OF THE INVENTION

An object of the present invention is to provide a mechanical safety interlock for a multiple-door switchgear cabinet.

Such a mechanical interlock provides an advantage in that all electrical power would be automatically removed from all connected electrical systems when any of the doors of the switchgear cabinet is opened. The mechanical interlocks are preferable to the conventional electrical safety interlocks which require continuous electric power to the electric interlocks in order to monitor the electrical interlock and any corresponding door position. This mechanical interlock provides superior safety conditions.

According to a first preferred embodiment of the present invention, a multiple-door switchgear cabinet is mountable to a storage and retrieval device, such as a load handling system, the switchgear cabinet including a cabinet housing containing electrical equipment and being connectable to an electrical power source; at least two doors attached to the cabinet housing, and providing access to the electrical equipment, the at least two doors including a first door and one or more secondary doors, the first door, when closed, providing electrical continuity through a main electrical power switch, and removing electrical continuity when the first door is open, wherein the doors are independently openable with respect to each other; and a mechanical interlock for controlling the order in which the doors are closed, the mechanical interlock being mounted to the cabinet and in communication with each of said doors when said doors are closed; and a locking bar movably attached to the first door, and releasably attached to the secondary door, wherein attachment to the secondary door prevents both doors from inadvertent opening.

In a further embodiment, the mechanical interlock prevents the first door from being closed if any other door is opened. This arrangement provides a distinct advantage when the main electrical power switch is in the region of the first door, wherein positive control of the main electrical power switch and the door corresponding thereto, i.e., the first door, are continuously monitored due to their close association.

In a further embodiment, when every secondary door is closed, the mechanical interlock permits the first door to be closed. This arrangement provides the advantage of a door hierarchy in that opening the first door will remove power to the entire device, but each of the secondary doors must be closed before the first door, corresponding to the main electrical power switch, can be closed. The superior safety arrangement makes the chance of accidental mishap exceedingly unlikely.

In a further embodiment, the mechanical interlock prevents the first door from being closed before the second door is closed, when both doors are open, and the second door must be closed first to reset the mechanical interlock against the biasing arrangement and to enable the main door to be closed to connect power to the switchgear cabinet.

In another embodiment, the first door overlaps with at least one edge of a nearest secondary door, and prevents the secondary door from being opened when the first door is closed. This arrangement provides the advantages of the first door being opened, and electrical power disconnected, no matter which door is opened first, and independent of the interlock arrangement.

In a further embodiment, the mechanical interlock includes a shaft rotatably mounted to the cabinet in proximity to each of the at least two doors; and two or more contact levers fixedly attached to the shaft, the number of contact levers corresponding to the number of cabinet doors, the spacing of the contact levers corresponding generally to the spacing of the doors.

This arrangement provides for the advantages of a simple and rugged mechanical solution for monitoring electrical power, which is unlikely to experience a mechanical failure even in the toughest conditions, e.g., a movable carrier of a storage and retrieval device.

In a further embodiment, the mechanical interlock is biased to a door blocking position, corresponding to an open main power switch, by a spring attached between the rotatable shaft and the cabinet housing. This provides the advantage of a simple and rugged means for ensuring the availability of force or energy necessary to prevent the first door from being closed when any of the secondary doors are opened. A spring may be any number of devices including coil springs, leaf springs, torsion springs, elastomers or any other mechanical energy-storage arrangement which is stable and reliable.

According to a further arrangement, the mechanical interlock is held in a closed-door position against the biasing device by at least one of the doors. The doors may, be held in place against the biasing arrangement by the locking bar or similar devices that are quickly and easily able to be reset, including magnetic catches, spring-loaded catches and friction-type catches. This arrangement provides the advantage of a direct communication between the doors and the interlock device. The elimination of any intermediate device reduces the chance for failure of the mechanical interlock arrangement, which improves safety.

In a further arrangement, each of the contact levers for the secondary doors, i.e. each contact lever except for the contact lever for the first door, are moved downward into a lower, closed-door position by closing the secondary doors. This arrangement provides the advantage of the ability to close each of the doors, other than the first door corresponding to the main power switch, in any order, in order to prepare the system for the application of electric power.

According to a further embodiment, the contact lever corresponding to the first door includes a shaft end attached to the rotatable shaft, and a terminal end opposite the shaft end, the terminal end having a rigid flag attached thereto. The flag provides the advantage of a mechanical warning signal to indicate that the first door is opened. The rigid flag may be arranged to protrude from the cabinet in the vicinity of the first door to provide a visual indication of the locked or unlocked state of the mechanical interlock system.

According to a further embodiment, when the first door and the secondary door are opened, the rigid flag of the first contact lever extends between the first door and cabinet housing and prevents the first door from closing until the first lever is rotated against the biasing force.

According to a further embodiment, each contact lever corresponding to the second and subsequent doors includes a shaft end attached to the shaft, and a terminal end opposite the shaft end: the terminal end having a pad attached thereto, the pad arranged to bear against an inner surface of the second and subsequent doors. wherein opening the second and subsequent doors releases the pad corresponding to that door and permits the mechanical interlock to bear against the first door according to the biasing device. The pad arrangement provides an advantage in that it may include a non-skid material which frictionally engages the second and subsequent doors to prevent or reduce the likelihood of inadvertent power disconnection via the main electrical power switch and minimizes or reduces the strength required in any mechanisms used to hold the second and subsequent doors closed.

In a further embodiment, the at least two doors of the multiple-door switchgear cabinet are hingedly attached to the housing. This arrangement provides a simple and reliable means for capturing the doors in a position for readily replacing them should they be dislodged such as when the doors are opened. Alternatively, the doors might be retained in the cabinet via springs, clips, clasps, magnets or other known arrangements, wherein the entire door might be dislodged from the cabinet.

According to a second preferred embodiment of the invention, a mutiple-door switchgear cabinet for mounting to a storage and retrieval device, such a load handling system, includes a cabinet housing containing electrical equipment and being connectable to an electrical power source; a first door, a second door and a third door attached to the cabinet housing, and providing access to the electrical equipment, wherein the first door, when closed providing electrical continuity through a main power switch, and removing electrical continuity when the first door is opened. the first door being releasably latchable in a closed position, wherein a latch holding the first door resists inadvertent opening; and a mechanical interlock for controlling the doors, the mechanical interlock mounted to the cabinet and in contact with each of said doors when said doors are closed, the mechanical interlock being biased by the biasing device to bear against the first door when any other door is opened, wherein opening at least one of the second and third doors releases the mechanical interlock and permits the biasing device to bear against the first door, wherein opening the first door removes electrical'continuity through the main power switch.

This arrangement provides the advantage of superior protection from the risk of electric shock, due to the total removal of electrical power from the system.

According to a further embodiment, when the first door and at least one of the second and third doors is open, the mechanical interlock prevents the first door from being closed before both the second and the third doors are in a closed position, wherein both the second and the third doors must be closed first to reset the mechanical interlock against the biasing device.

According to a further embodiment, if the second door and third door are closed, the interlock permits the first door to be closed.

These arrangements provide the advantage of a door hierarchy in that opening the first door will remove power to the entire device, but each of the second, third and subsequent doors must be closed before the first door, corresponding to the main electrical power switch, can be closed. The superior safety arrangement makes the chance of mishap exceedingly unlikely.

According to a further embodiment, the mechanical interlock includes a plurality of shafts rotatably mounted to the cabinet and in proximity to each of the at least two doors, wherein the first shaft is arranged between the first and the second door, and a second shaft is arranged between the first door and the third door; a first contact lever and a second contact lever are attached to the first shaft and the second shaft, respectively, adjacent the second and third doors; and a flag lever is mounted adjacent the first door and in rotational communication with the first and second shafts, wherein the biasing and rotation of at least one of the first and second shafts from a closed-door position to a door-blocking position rotates the flag lever, wherein the flag of the flag lever extends between the first door and the cabinet housing when the first door is open and prevents the first door from closing until the first and second contact levers are rotated downward against the biasing force.

According to a further embodiment, the plurality of shafts is mounted concentrically, with respect to each other.

According to another embodiment, the at least two doors are hingedly attached to the cabinet housing. This arrangement provides the advantage of doors which are able to be closed quickly and easily.

These arrangements provide the advantage of highly compact and reliable systems, wherein the contact levers corresponding to the second and third doors are able to bear against their respective doors, and upon the opening of the first door opening the main electrical power switch, without affecting the other door.

According to a third preferred embodiment, a multiple-door switchgear cabinet which may be coupled to a storage and retrieval device, such as a load handling system, includes: a cabinet housing containing electrical equipment and being connectable to an electrical power source; a first door, a second door and a third door attached to the cabinet housing, and providing access to the electrical equipment, wherein the first door, when closed, provides electrical continuity through the main electrical power switch, and removes electrical continuity when the first door is open; a first mechanical interlock for controlling the first door, the first mechanical interlock being mounted to the cabinet and in contact with the first door and the second door when said first and second doors are closed, the first mechanical interlock being biased by a first biasing force to bear against the first door when the second door is opened; and a second mechanical interlock for controlling the second door, the second mechanical interlock being mounted to the cabinet and in contact with the second door in the third door when said second and third doors are closed, the second mechanical interlock being biased by a second biasing device to bear against the second door upon opening the third door. wherein the opening of the second door releases the first mechanical interlock and permits the first biasing device to bear against the first door.

The various features of novelty and inventiveness which characterize the invention are pointed out with particularity in the claims annexed to and forming a part of this disclosure. For a better understanding of this invention, its operating advantages and specific objects attained by its uses, reference is made to the accompanying drawings and the descriptive manner in which preferred embodiments of the invention are illustrated.

DESCRIPTION OF THE PREFERRED EMBODIMENTS

Figure 1:
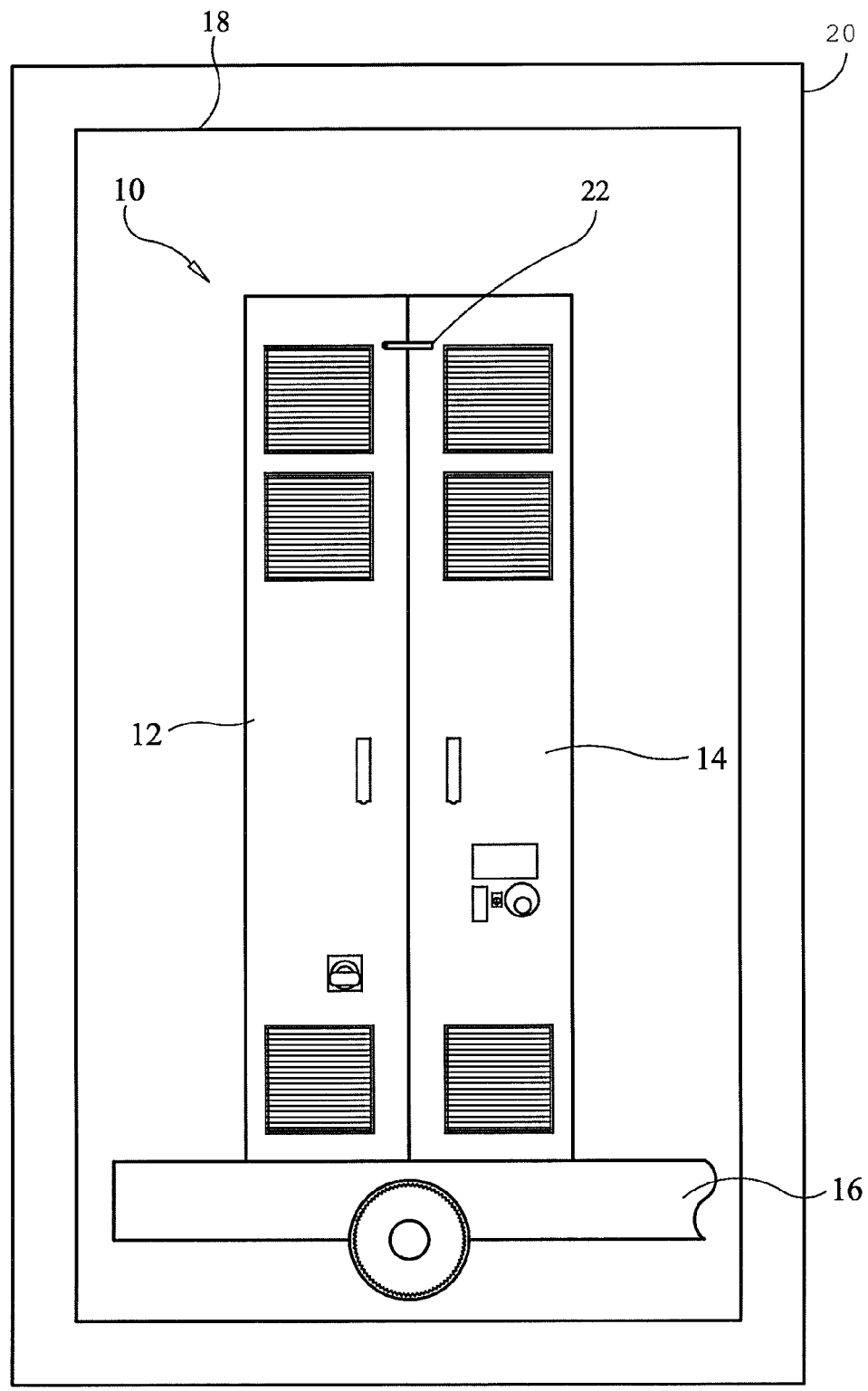
FIG. 1 illustrates a front view of a multiple-door switchgear cabinet.

Referring to the drawings, in particular, FIG. 1, a multiple-door switchgear cabinet 10 includes a first door 12 and a second door 14. The multiple-door switchgear cabinet 10 may be mounted to a movable carrier 16 of a storage and retrieval device 18, which may have a load handling system and is used in an industrial warehouse system 20. as illustrated in FIG. 1. The multiple-door switchgear cabinet 10 may include any reasonable number of doors, according to the space limitations and electrical requirements of the storage and retrieval device 18. A locking bar 22 may be movably attached to the outside of the first door 12 and releasably attached to the outside of the second door 14, wherein attachment of the locking bar 22 between the first door and the second door 14 prevents both doors from inadvertent opening. An exemplary arrangement for a two-door switchgear cabinet 10 is provided in FIG. 2, wherein the first door 12 and the second door 14 are presented in an open position.

Figure 2:
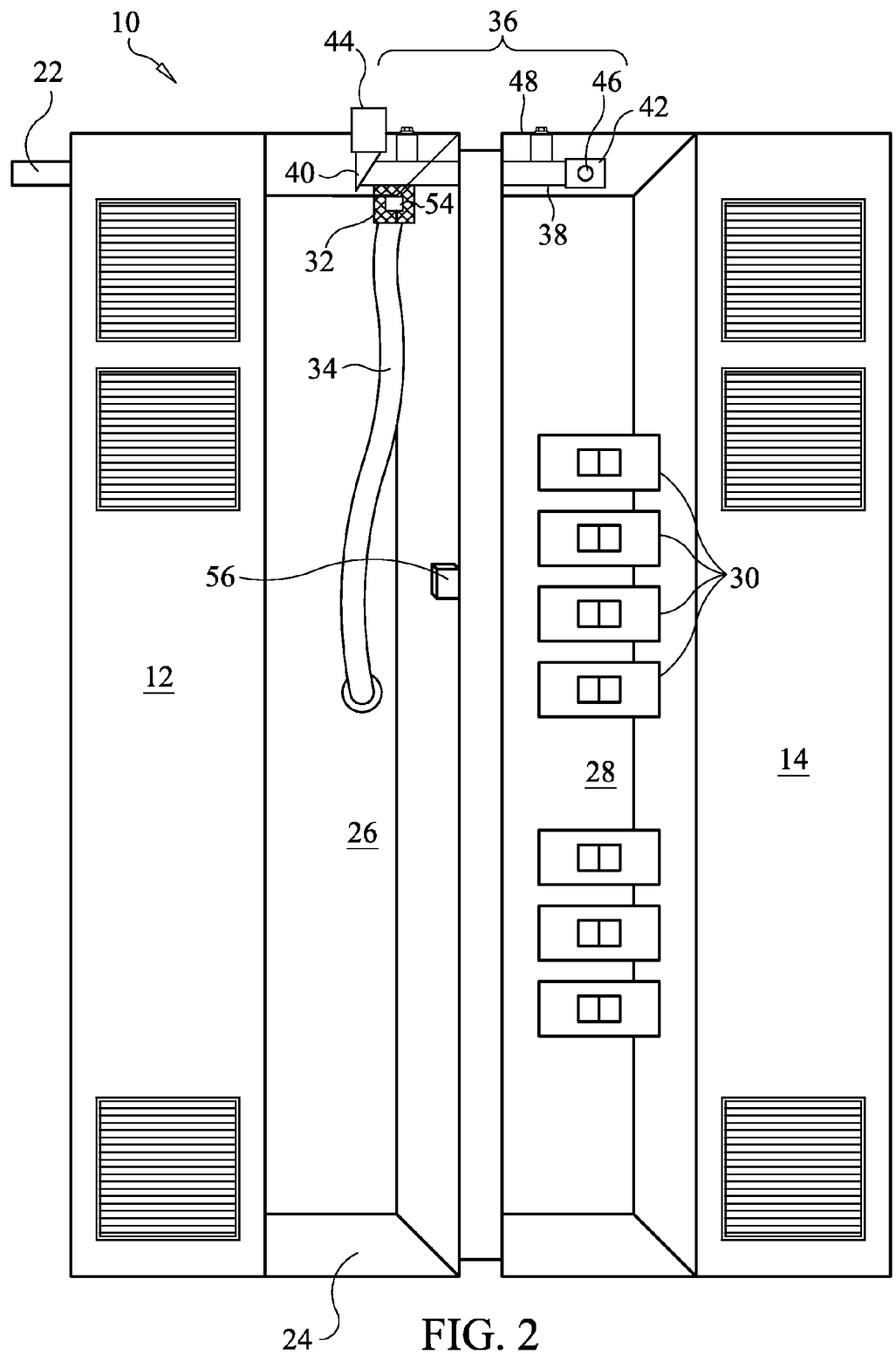
FIG. 2 illustrates an open-door view of a multiple-door switchgear cabinet having two doors, according to the present invention.

As depicted in FIG. 2. the multiple-door switchgear cabinet 10 includes a cabinet housing 24 which may define a number of smaller spaces 26, 28 within. As is the nature of switchgear cabinets, a number of various electrical equipment pieces 30 may be included within the cabinet housing 24. In a non-limiting example provided for illustration purposes, a first space 26 within the cabinet housing 24, corresponding to the first door 12, includes a main electrical power switch 32 which is supplied with electrical power via an electrical power source 34. Other electrical equipment may be stored in the first space 26, but for this example the main electrical power source 34 and main electrical power switch 32 are included in the first space 26. As a matter of practice, it may be prudent to limit the amount of equipment in the first space 26, so as to define and isolate the main electrical power source 34 quite clearly and thereby significantly reduce the hazards involved in handling electrical power on the movable carrier 16.

Figure 3:
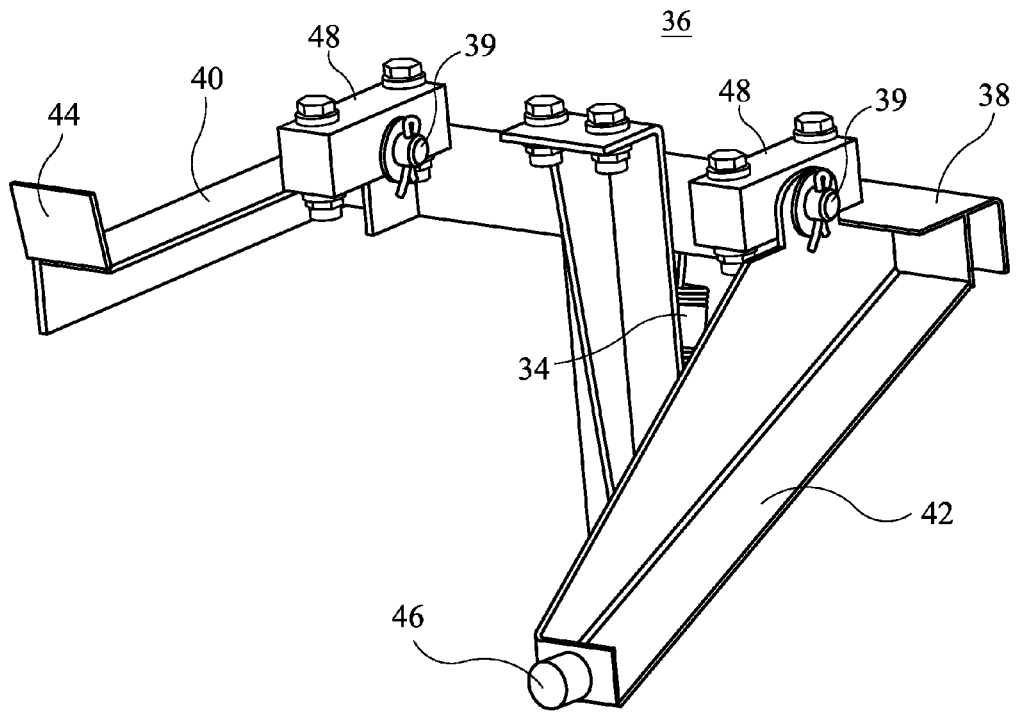
FIG. 3 illustrates a perspective view of a mechanical interlock arrangement for a multiple-door switchgear cabinet, according to the present invention.
Figure 4:
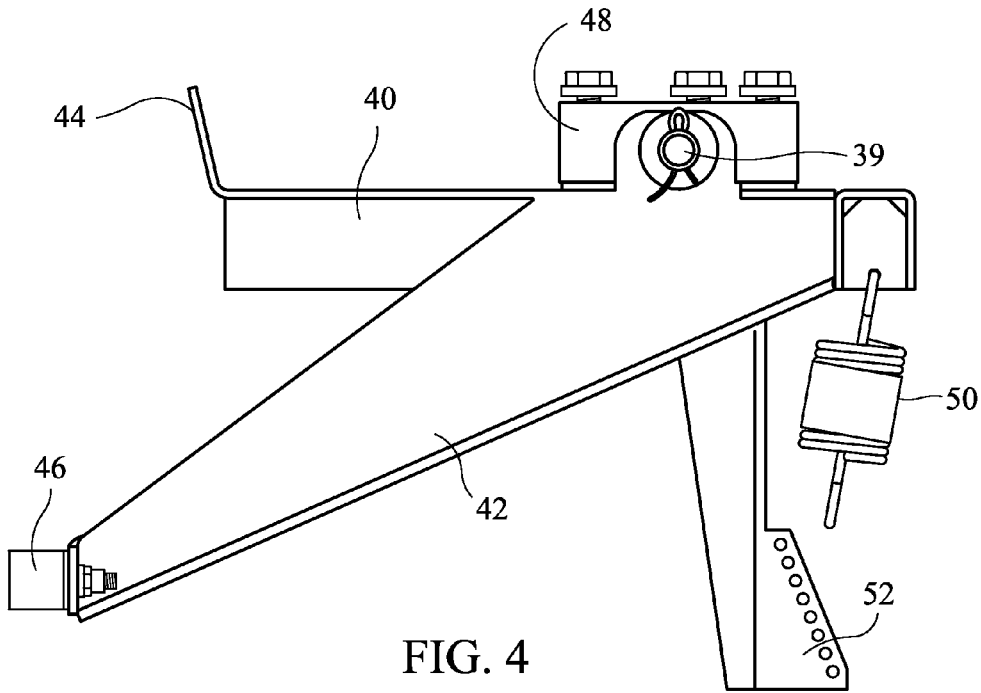
FIG. 4 illustrates a side view of a mechanical interlock for a multiple-door switchgear cabinet, according to the present invention.

As illustrated in FIGS. 3 and 4. the mechanical interlock 36 may include a rotating shaft 38, a first contact lever 40, a second contact lever 42, a flag 44 attached to the first contact lever at a distal end, and a pad 46 which is fixed to the distal end of the second contact lever 42. The proximal ends of the first contact lever and second contact lever 40, 42 are fixed to the rotating shaft 38. The rotating shaft 38 may be secured to the cabinet housing 24 by a number of pins 39 and mounting blocks 48 or similar arrangement. In accordance with the teachings of the present invention, the mechanical interlock 36 is included in the cabinet housing 24, and may be mounted to a top, back or other location in the cabinet housing 24 within the functional limitations of the mechanical interlock 36. A biasing device 50, such as a spring, is connected between the rotating shaft 38 and a spring mount 52 within the cabinet housing 24, and which is attachable to the cabinet housing 24. The biasing device 50 provides a tensioning force between the rotating shaft 38 and the spring mount 52 to bias the mechanical interlock 36 to bear against one or more doors 12, 14. according to the principles explained herein.

Further details regarding the particular arrangements of various mechanical interlock systems are described below with reference to other figures. More than one mechanical interlock 36 may be incorporated into a multiple-door switchgear cabinet 10 in a complementary fashion according to the teachings presented herein. FIGS. 3 and 4 illustrate perspective and side views of the mechanical interlock having first contact lever 40 and second contact lever 42, which renders this mechanical interlock 36 suitable for engaging two doors 12, 14 whether of a two-door arrangement or the two doors 12, 14 of a multiple-door switchgear cabinet 10. The first contact lever 40 may correspond to the first door 12 of the cabinet housing 24, and may include a first contact element, such as the flag 44, described above, at a terminal end, adjacent the first door 12. The second contact lever 42 may include a second contact element such as a pad 46 which may bear against the second door 14 in the two-door arrangement discussed in this non-limiting example. The rotating shaft 38 may be provided for location of the first and second contact levers 40, 42, which may rotate as a single unit. A mechanical interlock 36 may be mounted to the cabinet housing 24 via one or more mounting blocks 48. which may be made of a non-conducting plastic material. The biasing device 50 is attached to the mechanical interlock 36 to provide biasing energy necessary for bearing against the associated doors 12, 14 and thereby extending through the door openings to dictate the order in which the doors shall be closed. The biasing device 50 may be a coil spring: torsion spring, leaf spring or other stable and predictable mechanical energy storage device that is suitable for use in an electrical environment. The biasing device 50 biases the mechanical interlock 36 to obstruct the doors 12, 14 when they are opened. As described above, the main electrical power switch 32 is opened when the first door 12 is opened. A pin or lever 54 (see FIG. 2) may be included between the first door 12 and the main electrical power switch 32 to activate and deactivate the main electrical power switch 32. The first door 12 and/or the second door 14 may include a releasable latch mechanism 56 (see FIG. 2), which is strong enough, singly or collectively, to resist the biasing force of the biasing device 50 of the mechanical interlock 36. The biasing device 50 is arranged to cause the terminal ends of the contact levers 40, 42 to bear against any of the doors 12, 14 which are closed. However, this does not necessarily mean that the biasing force is sufficient to force the doors 12, 14 open. Although the biasing device 50 may be made strong enough to force the doors 12, 14 when the locking bar 22 is released, the biasing device 50 may also be only strong enough to rotate the shaft 38 and extend the flag 44 and pad 46 only when the doors 12, 14 are already opened.

Figure 5:
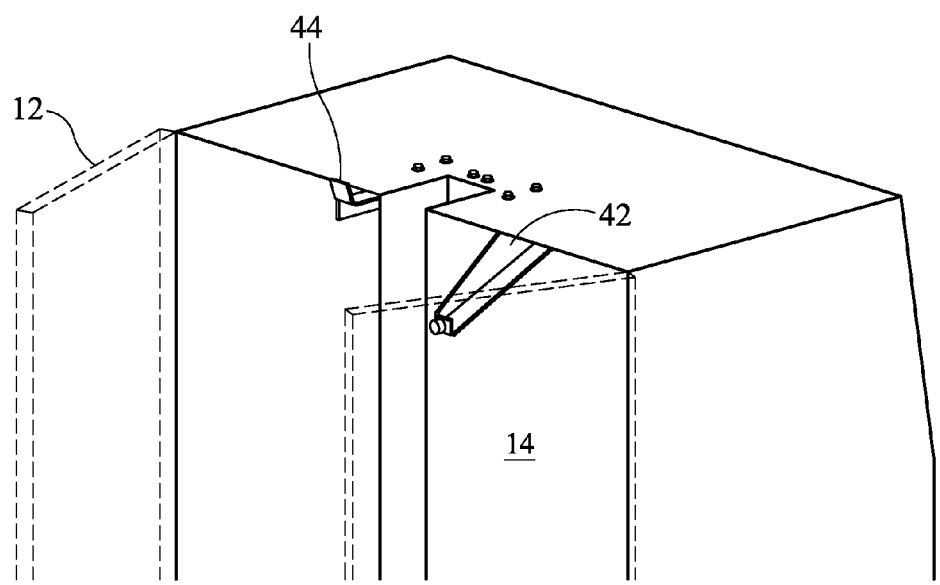
FIG. 5 illustrates a perspective view of a multiple-door switchgear cabinet having two doors in an open position, and which are presented as being transparent for the purposes of illustration, according to the present invention.

FIG. 5 illustrates an open-door condition on the multiple-door switchgear cabinet 10. In this example, the first door 12 and the second door 14 were opened. Upon release of the door's pressure on the pad 46 of the second contact lever 42, the biasing device 50 moves the flag 44 of the first contact lever 40 to bear against the first door 12. Movement of the first door 12 to an open position allows the flag 44 to rotate into a blocking position between the first door 12 and the cabinet housing 24, as illustrated in FIG. 5.

Figure 6:
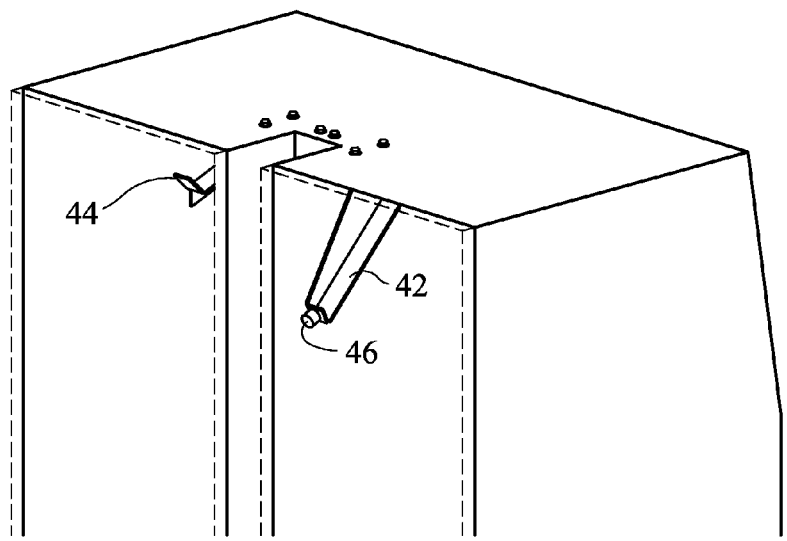
FIG. 6 illustrates a perspective view of a multiple-door switchgear cabinet having two doors which are in a closed position, and which are presented as being transparent for the purposes of illustration, according to the present invention.

FIG. 6 illustrates a condition where both the first door 12 and the second door 14 are in a closed position. The doors 12, 14 are presented in a transparent view so that the positions of the contact levers 40, 42 in a closed position may be seen. The strength of the biasing device 50 may be arranged so as to limit the biasing force to prevent the biasing device 50 from opening the doors 12, 14, even when the locking bar 22 is released.

Figure 7:
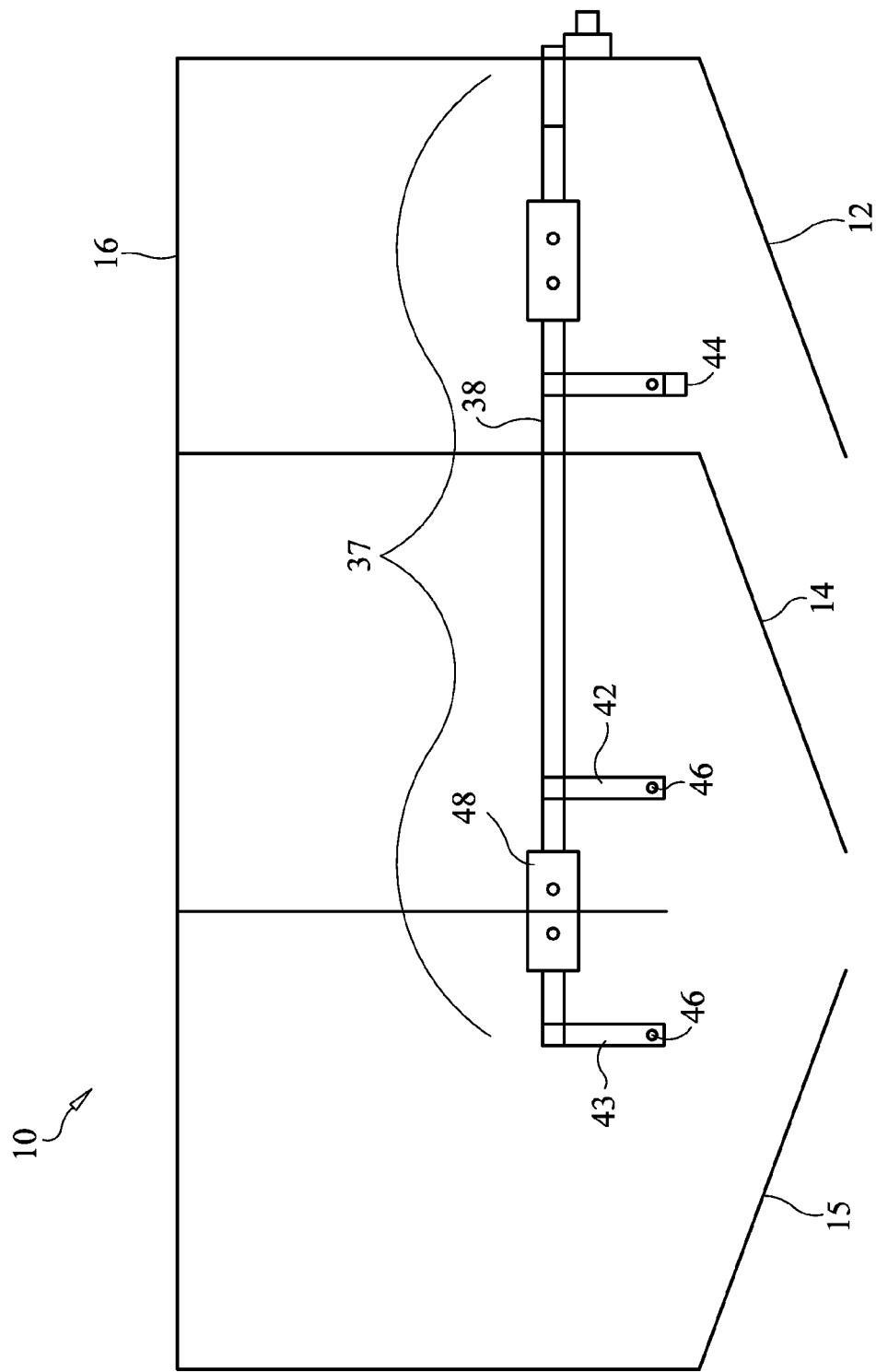
FIG. 7 illustrates a top view of a multiple-door switchgear cabinet, wherein the mechanical interlock includes a shaft rotatably mounted to the cabinet and in proximity to each of the doors, according to the present invention.

FIG. 7 illustrates an example of a multiple-door switchgear cabinet 10 having three doors 12. 14, 15. A three-door mechanical interlock 37 is in communication with each of the doors 12, 14, 15, and functions in the same manner as the two-door arrangement, described above, with the addition of a third door IS and a third contact lever 43 mounted to the shaft 38. Accordingly, when both of the second and third doors 14, 15 are opened, the mechanical interlock 37 is biased by the biasing device 50 to bear against the first door 12, and opening of the first door 12 thereby opens the main electrical power switch 32 and removes electrical power from all the electrical equipment 30 within the cabinet housing 24 and any other areas or equipment powered through the main electrical power switch 32. Like the embodiments described above, both the second door 14 and the third door 15 must be closed first to reset the mechanical interlock 37 and the biasing device 50 so as to remove the flag 44 from a blocking position adjacent the first door 12. This permits the first door 12 to be fully closed which then closes the main electrical power: switch 32 and provides power to the system. Replacement of the locking bar 22 prevents the doors from being opened. One or more locking bars 22 may be used.

Figure 8:
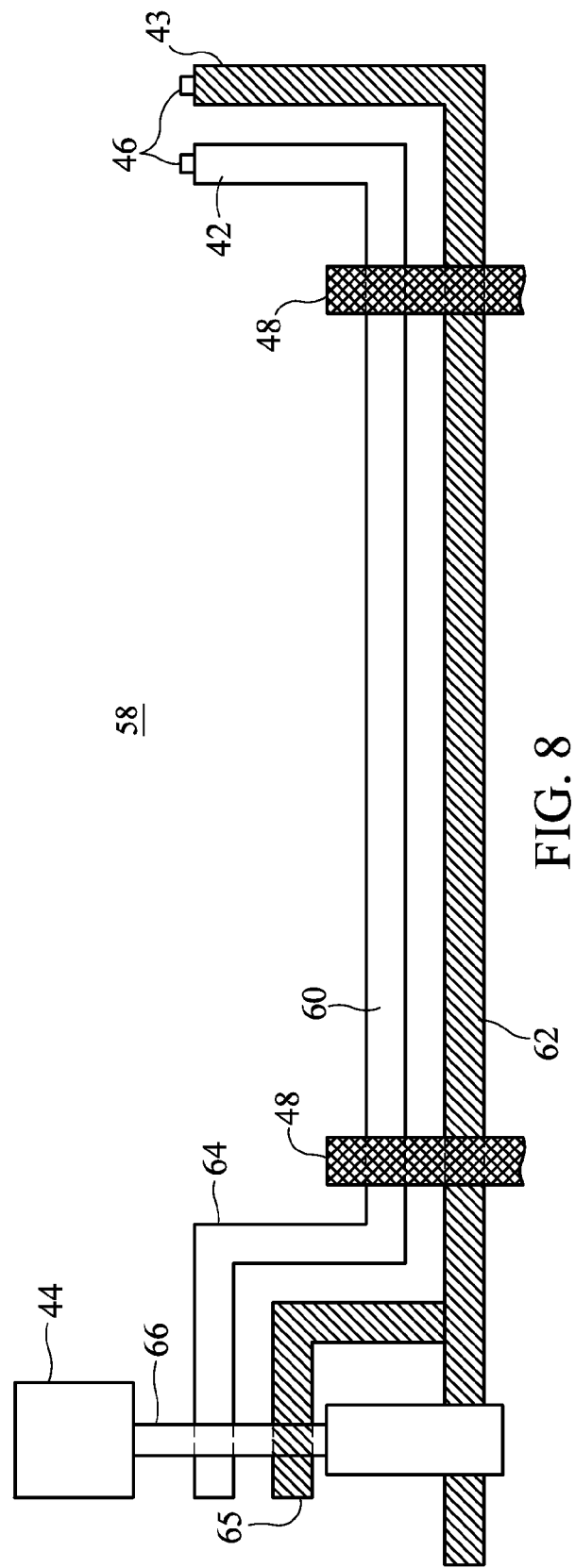
FIG. 8 illustrates a front view of a mechanical interlock arrangement having two rotatable shafts arranged side-by-side, according to the present invention.
Figure 9:
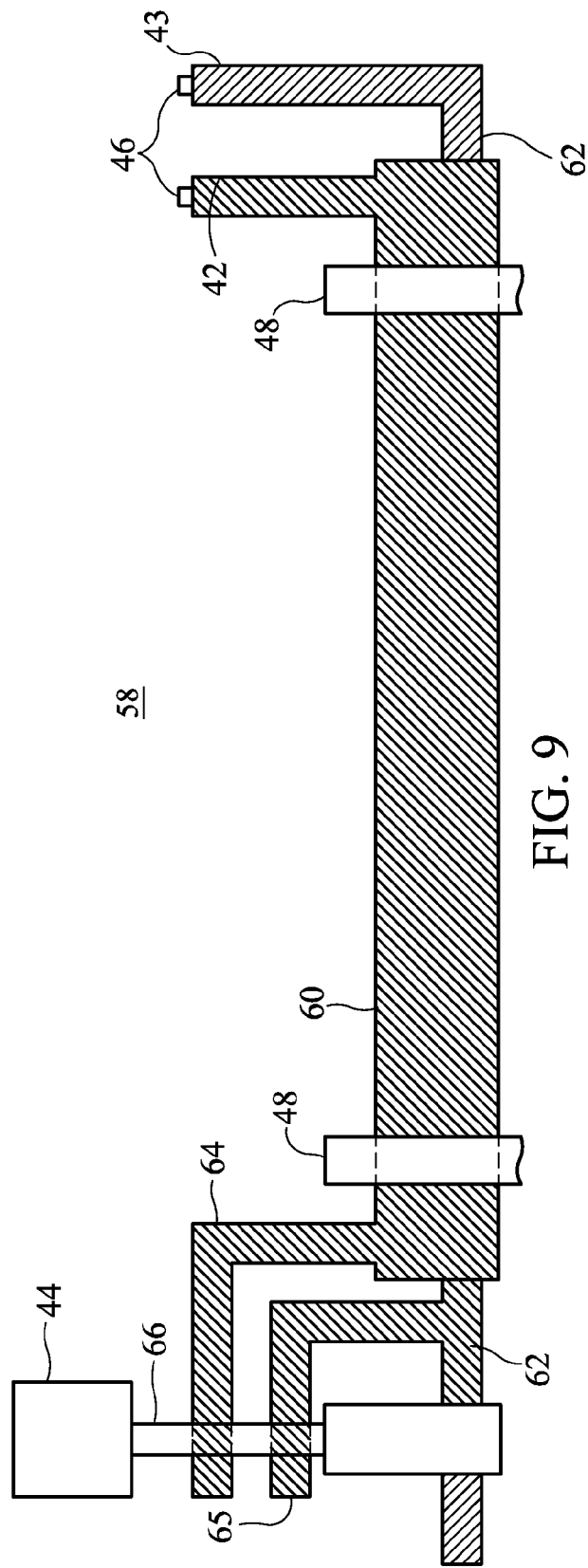
FIG. 9 illustrates a front view of a mechanical interlock arrangement having a pair of concentric shafts which are arranged for rotation, according to the present invention.
Figure 10:
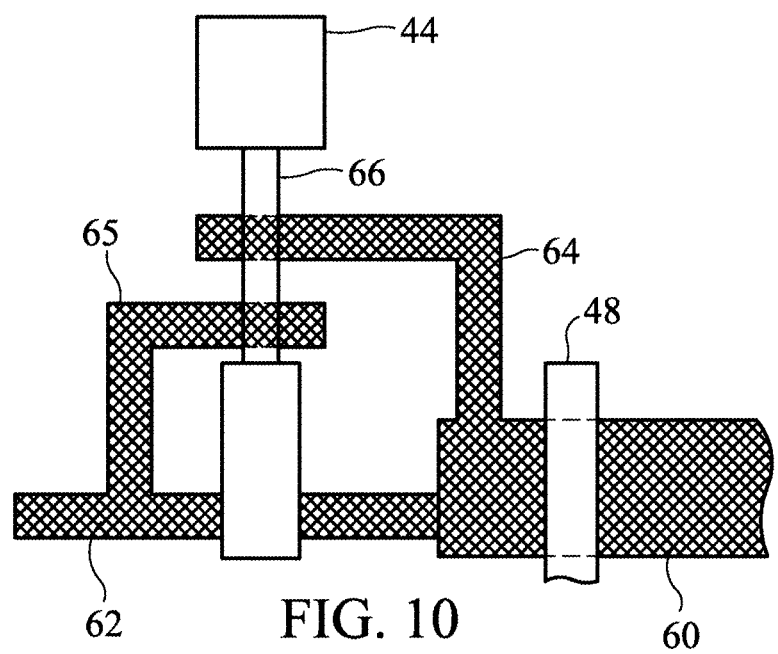
FIG. 10 illustrates an alternative embodiment of a concentric shaft arrangement wherein the shafts are arranged for rotation, according to the present invention.

FIGS. 8-10 provide various arrangements for alternative mechanical interlocks 58 for two or more doors 12, 14. 15. FIG. 8 illustrates a two-shaft arrangement 58 where a first shaft 60 is in communication with the first door 12 and the second door 14, and a second shaft 62 is in communication with the third door 15 and the first door 12. FIG. 8 shows only the mechanical interlock arrangement 58 and has omitted the doors for clarity. A difference between this alternative mechanical interlock arrangement 58 and the mechanical interlock 36 of FIGS. 3-6 is the inclusion of two rotating shafts 60, 62. The principles used in this two-shaft arrangement are generally the same as presented above. When either the second door 14 or third door 15 is opened, the contacts corresponding to that door will be permitted to move according to the biasing device attached to the shafts 60, 62. This condition will bias the flag 44 to bear against the first door 12, wherein opening the first door will open the main power switch 32. This arrangement may be expanded to accept additional doors by adding additional shafts. FIGS. 9 and 10 illustrate a more compact arrangement of the alternative mechanical interlock 58, wherein the first shaft 60 is concentric with the second shaft 62. Internal bearings or bushes, between the shafts 60, 62 or external bearings may be incorporated to reduce friction and ensure reliable operation of the alternative mechanical interlock arrangement 58. As in FIG. 8, the first and second shafts 60, 62 of FIGS. 9 and 10 include engagement arms 64, 65 which engage the two-way contact lever 66 and thereby affect the position of the flag 44 attached thereto. With respect to the shaft arrangements 60. 62 of FIGS. 9 and 10, additional concentric or parallel shafts may be added to accommodate additional bores in the cabinet housing 24.

Figure 11:
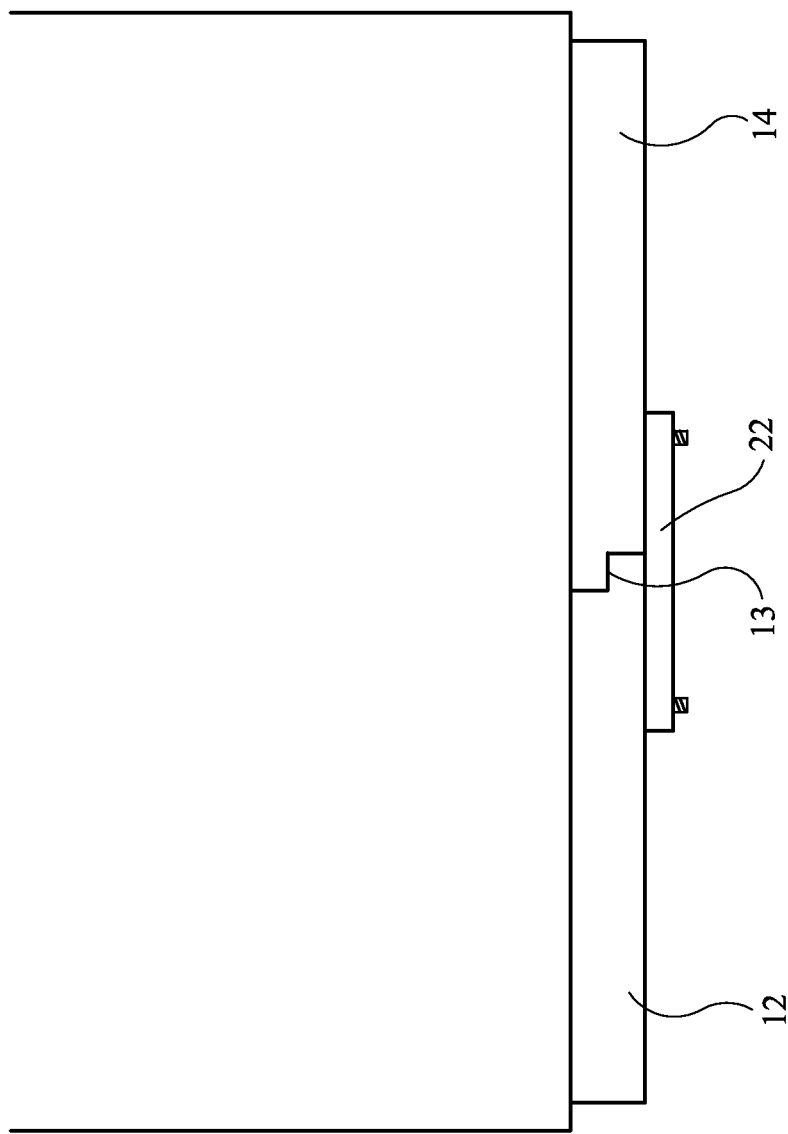
FIG. 11 illustrates a top view of a two-door switchgear cabinet, wherein the first door overlaps with the second door.

FIG. 11 illustrates a top view of a two-door cabinet 10. wherein the first door 12 overlaps with an edge of the second door 14 at an overlap region 13. This arrangement prevents the second door 14 from being opened without the first door 12 also being opened. This enhances the safety of the mechanical device.

Figure 12:
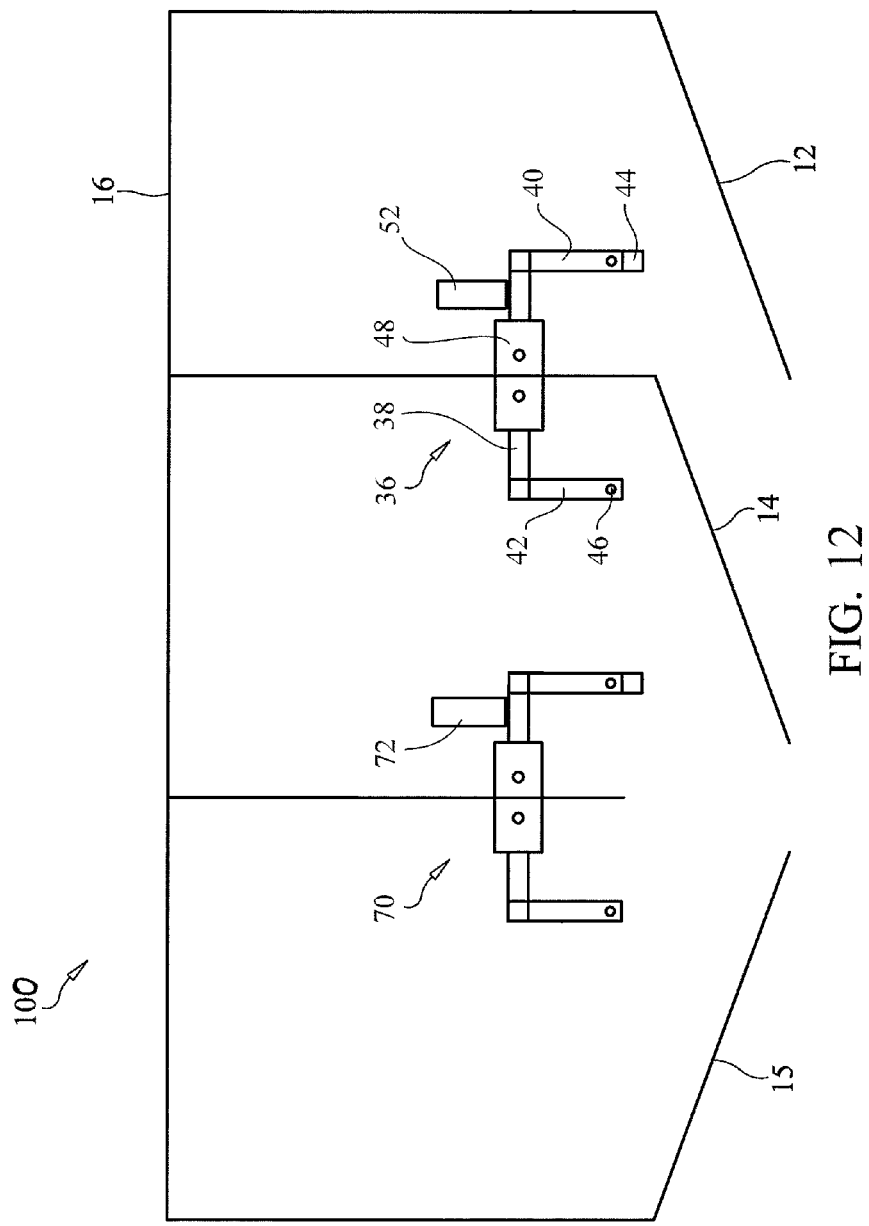
FIG. 12 illustrates a top view of a multiple-door switchgear cabinet comprising a first mechanical interlock configured for contacting the first door and the second door and a second mechanical interlock configured for contacting the second door and the third door, wherein the opening of the second door releases the first mechanical interlock and permits the first biasing device to bear against the first door.

FIG. 12 illustrates a top view of a multiple-door switchgear cabinet 100 which is mountable to a storage and retrieval device. The switch gear cabinet 100 comprises a cabinet housing 16 containing electrical equipment and being connectable to an electrical power source, a first door 12, a second door 14 and a third door 15 attached to the cabinet housing 16 and providing access to the electrical equipment, wherein the first door 12, when closed, provides electrical continuity through a main electrical power switch, and removes electrical continuity when the first door 12 is open. The switchgear cabinet 100 further comprises a first mechanical interlock 36 for controlling the first door 12. The first mechanical interlock 36 is mounted to the cabinet 100 and in contact with the first door 12 and the second door 14 when said first and second doors 12, 14 are closed. The first mechanical interlock 36 is biased by a first biasing device 52 to bear against the first door 12 when the second door 14 is opened. The switch gear cabinet 100 further comprises a second mechanical interlock 70 for controlling the second door 14. The second mechanical interlock 70 is mounted to the cabinet 100 and in contact with the second door 14 and the third door 15 when said second and third doors 14, 15 are closed. The second mechanical interlock 70 is biased by a second biasing device 72 to bear against the second door 14 upon opening the third door 15. Opening the second door 14 releases the first mechanical interlock 36 and permits the first biasing device 52 to bear against the first door 12.

What is claimed is:

1. A multiple-door switchgear cabinet mountable to a storage and retrieval device, the switchgear cabinet comprising:
    a cabinet housing containing electrical equipment and being connectable to an electrical power source;
    a first door and a second door, the two doors attached to the cabinet housing and providing access to the electrical equipment, the first door, when closed, providing electrical continuity through a main electrical power switch, and removing electrical continuity when the first door is open, wherein said doors are independently openable with respect to each other;
    a mechanical interlock for controlling the order in which the doors are closed, the mechanical interlock being mounted to the cabinet and in communication with each of said doors when said doors are closed; the mechanical interlock comprising:
        a shaft rotatably mounted to the cabinet and in proximity to each of the two doors; and
        two contact levers fixedly attached to the shaft, the number of contact levers corresponding to the number of cabinet doors, the spacing of the contact levers corresponding generally to the spacing of the doors;
        wherein the contact lever corresponding to the first door includes a shaft end attached to the shaft and a terminal end opposite the shaft end the terminal end having a rigid flag attached thereto; and
    a locking bar movably attached to the first door, and releasably attached to the second door, wherein attachment to the second door prevents both doors from inadvertent opening.

2. The multiple-door switchgear cabinet of claim 1, wherein the interlock prevents the first door from being closed if the second door is opened.

3. The multiple-door switchgear cabinet of claim 2, wherein if the second door is closed, the interlock permits the first door to be closed.

4. The multiple-door switchgear cabinet of claim 1, wherein the mechanical interlock prevents the first door from being closed before the second door, when both doors are open, and the second door must be closed first to reset the mechanical interlock against a biasing arrangement and to enable the first door to be closed to connect power to the switchgear cabinet.

5. The multiple-door switchgear cabinet of claim 1, wherein the first door overlaps with at least one edge of the second door, and prevents the second door from being opened when the first door is closed.

6. The multiple-door switchgear cabinet of claim 1, wherein the mechanical interlock is biased to a door-blocking position by a spring attached between the rotatable shaft and the cabinet housing.

7. The multiple-door switchgear cabinet of claim 1, wherein the mechanical interlock is held in a closed-door position against a biasing device by one of the doors.

8. The multiple-door switchgear cabinet of claim 1, wherein the contact lever for the second door is moved downward into a lower position by closing the second door.

9. The multiple-door switchgear cabinet of claim 1, wherein when the first door and the second door are opened the first door, the rigid flag of the first contact lever extends between the first door and the cabinet housing and prevents the first door from closing until the first contact lever is rotated against the biasing force.

10. The multiple-door switchgear cabinet of claim 1, wherein the contact lever corresponding to the second door includes a shaft end attached to the shaft, and a terminal end opposite the shaft end, the terminal end having a pad attached thereto, the pad arranged to bear against an inner surface of the second door, wherein opening of the second door releases the pad and permits the mechanical interlock to bear against the first door according to a biasing device.

11. The multiple-door switchgear cabinet of claim 1, wherein the two doors are hingedly attached to the cabinet housing.

12. A storage and retrieval device having a multiple-door switchgear cabinet mounted thereto, the switchgear cabinet comprising:
    a cabinet housing containing electrical equipment and being connectable to an electrical power source;
    a first door, a second door and a third door attached to the cabinet housing, and providing access to the electrical equipment, wherein the first door, when closed, providing electrical continuity through a main power switch, and removing electrical continuity when the first door is open, the first door being releasably latchable in a closed position, wherein a latch holding the first door resists inadvertent opening;
    a mechanical interlock for controlling the doors, the mechanical interlock mounted to the cabinet and in contact with each of said doors when said doors are closed, the mechanical interlock being biased by a biasing device to bear against the first door when any other door is open;
    the mechanical interlock comprising:
        a plurality of shafts rotatably mounted to the cabinet and in proximity to each of the doors,
        wherein a first shaft is arranged between the first door and the second door, and wherein a second shaft is arranged between the first door and the third door;
        a second contact lever attached to the first shaft adjacent the second door and a third contact lever attached to the second shaft, adjacent the third door; and a flag lever mounted adjacent the first door and in rotational communication with the first and the second shaft, wherein the biasing and rotation of at least one of the first and the second shaft from a closed-door position to an open-door door-blocking position rotates the flag lever, wherein a flag of the flag lever extends between the first door and the cabinet housing when the first door is open and prevents the first door from closing until the second contact lever and the third contact lever are rotated downward against the biasing force;

wherein opening at least one of the second and third doors releases the mechanical interlock and permits the biasing device to bear against the first door, wherein opening the first door removes electrical continuity through the main power switch.

13. The device of claim 12, wherein when the first door and at least one of the second door and the third door are open, the mechanical interlock prevents the first door from being closed before the second door and the third door are closed, wherein the second door and the third door must be closed first to reset the mechanical interlock against the biasing device.

14. The device of claim 12, wherein if the second door and the third door are closed, the interlock permits the first door to be closed.

15. The device of claim 12, wherein the plurality of shafts are mounted concentrically.

16. A multiple-door switchgear cabinet mountable to a storage and retrieval device, the switchgear cabinet comprising:
a cabinet housing containing electrical equipment and being connectable to an electrical power source;
a first door, a second door and a third door attached to the cabinet housing, and providing access to the electrical equipment, wherein the first door, when closed, provides electrical continuity through a main electrical power switch, and removes electrical continuity when the first door is open;
a first mechanical interlock for controlling the first door, the first mechanical interlock being mounted to the cabinet and in contact with the first door and the second door when said first and second doors are closed, the first mechanical interlock being biased by a first biasing device to bear against the first door when the second door is opened; and
a second mechanical interlock for controlling the second door, the second mechanical interlock being mounted to the cabinet and in contact with the second door and the third door when said second and third doors are closed, the second mechanical interlock being biased by a second biasing device to bear against the second door upon opening the third door, wherein the opening of the second door releases the first mechanical interlock and permits the first biasing device to bear against the first door.

17. A multiple-door switchgear cabinet mountable to a storage and retrieval device, the switchgear cabinet comprising:
a cabinet housing containing electrical equipment and being connectable to an electrical power source;
a first door and a second door, the two doors attached to the cabinet housing and providing access to the electrical equipment, the first door, when closed, providing electrical continuity through a main electrical power switch, and removing electrical continuity when the first door is open, wherein said doors are independently openable with respect to each other; and
a mechanical interlock for controlling the order in which the doors are closed, the mechanical interlock being mounted to the cabinet and in communication with each of said doors when said doors are closed; the mechanical interlock comprising:
a shaft rotatably mounted to the cabinet and in proximity to each of the two doors; and
two contact levers fixedly attached to the shaft, the number of contact levers corresponding to the number of cabinet doors, the spacing of the contact levers corresponding generally to the spacing of the doors;
wherein the contact lever corresponding to the second door includes a shaft end attached to the shaft, and a terminal end opposite the shaft end, the terminal end having a pad attached thereto, the pad arranged to bear against an inner surface of the second door, wherein opening of the second door releases the pad and permits the mechanical interlock to bear against the first door according to a biasing device; and
a locking bar movably attached to the first door, and releasably attached to the second door, wherein attachment to the second door prevents both doors from inadvertent opening.

18. The multiple-door switchgear cabinet of claim 17, wherein the interlock prevents the first door from being closed if the second door is opened.

19. The multiple-door switchgear cabinet of claim 18, wherein, if the second door is closed, the interlock permits the first door to be closed.

20. The multiple-door switchgear cabinet of claim 17, wherein the mechanical interlock prevents the first door from being closed before the second door, when both doors are open, and the second door must be closed first to reset the mechanical interlock against the biasing device and to enable the first door to be closed to connect power to the switchgear cabinet.

* * * * *